US010712754B2

(12) United States Patent
Quaglia et al.

(10) Patent No.: US 10,712,754 B2
(45) Date of Patent: Jul. 14, 2020

(54) PRESSURE REGULATING SHUT-OFF VALVE

(71) Applicant: Microtecnica S.r.l., Turin (IT)

(72) Inventors: Enrico Quaglia, Turin (IT); Dario Savino, Palazzolo V.se (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 15/423,653

(22) Filed: Feb. 3, 2017

(65) Prior Publication Data

US 2017/0220055 A1 Aug. 3, 2017

(30) Foreign Application Priority Data

Feb. 3, 2016 (EP) .................................... 16154112

(51) Int. Cl.
| | |
|---|---|
| *G05D 16/10* | (2006.01) |
| *F16K 1/12* | (2006.01) |
| *F16K 31/363* | (2006.01) |
| *F16K 17/04* | (2006.01) |
| *F16K 27/00* | (2006.01) |
| *B33Y 10/00* | (2015.01) |
| *B33Y 80/00* | (2015.01) |
| *B22F 3/105* | (2006.01) |
| *B22F 5/10* | (2006.01) |
| *B64D 15/02* | (2006.01) |

(52) U.S. Cl.
CPC ......... *G05D 16/106* (2013.01); *B22F 3/1055* (2013.01); *B22F 5/106* (2013.01); *B33Y 10/00* (2014.12); *B33Y 80/00* (2014.12); *B64D 15/02* (2013.01); *F16K 1/123* (2013.01); *F16K 1/126* (2013.01); *F16K 17/04* (2013.01); *F16K 27/00* (2013.01); *F16K 31/363* (2013.01)

(58) Field of Classification Search
CPC ...... G05D 16/106; B33Y 10/00; B33Y 80/00; B22F 3/1055; B22F 5/106; B64D 15/02; F16K 1/126; F16K 17/04; F16K 27/00; Y10T 137/3367
USPC ......................................................... 137/219
See application file for complete search history.

(56) References Cited

U.S. PATENT DOCUMENTS

| 2,914,079 A * 11/1959 | Hertrich | .................... B04B 9/06 |
| | | 137/219 |
| 2,950,732 A * 8/1960 | Lambert | ................. F16K 1/126 |
| | | 137/219 |

(Continued)

FOREIGN PATENT DOCUMENTS

| DE | 102013002242 A1 | 8/2014 |
| GB | 2520576 A | 5/2015 |

(Continued)

OTHER PUBLICATIONS

Extended European Search Report, European Search Report/Declaration of no Search and European Search Opinion for European Application No. 16154112.3, dated Aug. 8, 2016, 7 pages.

*Primary Examiner* — Jessica Cahill

(74) *Attorney, Agent, or Firm* — Cantor Colburn LLP

(57) ABSTRACT

There is provided a pressure regulating shut-off valve comprising a valve body, at least one piston serving as a regulating piston and/or a shut-off piston, a solenoid valve, and a pressure relief valve; wherein the valve body defines an inlet and an outlet, and comprises at least a portion formed by an additive manufacturing process.

11 Claims, 6 Drawing Sheets

(56) References Cited

U.S. PATENT DOCUMENTS

| | | | | |
|---|---|---|---|---|
| 3,172,420 A | * | 3/1965 | Brown | B64D 37/20 |
| | | | | 137/219 |
| 3,362,424 A | * | 1/1968 | Smith | B64D 13/02 |
| | | | | 137/220 |
| 3,380,469 A | * | 4/1968 | Salerno | B64D 13/02 |
| | | | | 137/219 |
| 3,734,120 A | * | 5/1973 | Rowe | G05D 16/106 |
| | | | | 137/220 |
| 3,792,713 A | | 2/1974 | Zadoo | |
| 3,901,266 A | * | 8/1975 | Guy | G05D 7/0153 |
| | | | | 137/219 |
| 6,446,657 B1 | * | 9/2002 | Dziorny | F01D 17/105 |
| | | | | 137/219 |
| 6,742,539 B2 | | 6/2004 | Lyons | F16K 1/126 |
| | | | | 137/219 |
| 7,353,837 B2 | * | 4/2008 | Biester | F16K 1/12 |
| | | | | 137/219 |
| 8,910,653 B2 | * | 12/2014 | McAuliffe | F16K 31/12 |
| | | | | 137/220 |
| 9,766,632 B2 | * | 9/2017 | Volovec | G05D 7/014 |
| 10,082,221 B2 | * | 9/2018 | Volovec | F16K 31/128 |
| 2004/0261859 A1 | | 12/2004 | Callies | |
| 2005/0199298 A1 | | 9/2005 | Farrington | |
| 2009/0183790 A1 | | 7/2009 | Moore | |
| 2010/0326089 A1 | | 12/2010 | Weber et al. | |
| 2011/0147032 A1 | * | 6/2011 | Weyer | E02F 3/3663 |
| | | | | 173/218 |
| 2015/0362080 A1 | * | 12/2015 | Vu | F16K 1/42 |
| | | | | 137/1 |
| 2015/0369372 A1 | * | 12/2015 | Hrdlichka | F01D 25/02 |
| | | | | 137/334 |
| 2016/0004256 A1 | * | 1/2016 | Volovec | G05D 7/014 |
| | | | | 137/220 |
| 2017/0102076 A1 | * | 4/2017 | Reynolds | F16K 1/52 |
| 2017/0102089 A1 | * | 4/2017 | Griffin, Jr. | B33Y 30/00 |

FOREIGN PATENT DOCUMENTS

| | | | | |
|---|---|---|---|---|
| WO | WO-2015136021 A1 | * | 9/2015 | F16K 31/128 |
| WO | 2015191960 A1 | | 12/2015 | |

* cited by examiner

Fig. 2 --Prior Art--

PRESSURE REGULATING SHUT-OFF VALVE

FOREIGN PRIORITY

This application claims priority to European Patent Application No. 16154112.3 filed Feb. 3, 2016, the entire contents of which is incorporated herein by reference.

TECHNICAL FIELD

The present invention concerns a pressure regulating shut-off valve, particularly a pneumatic anti-ice pressure regulating shut-off valve for use in the field of aeronautics.

BACKGROUND

Solenoid controlled pressure regulating and shut-off valves (PRSOV) are designed to operate in the inlet anti-ice system of an aircraft engine. A known PRSOV comprises two pistons within sleeves defined by the main body of the valve. The shut-off function is pneumatically operated and electrically controlled by an on-board mounted solenoid valve, while the pressure regulating function is controlled by a pressure relief valve. Both functions are achieved using the inlet pressure and flow as power muscle to the control elements. In order to enable the operations of the control elements, suitable passages are machined within, or externally affixed to, the valve, for example as pipes. A manual override is often included which enables operation and locking of the valve in the fully open position.

The PRSOV is a compact unit which may provide multiple functions. For example, the PRSOV may provide a regulating function for regulating downstream engine bleed air pressures, which is activated when the solenoid is de-energized. The PRSOV may also provide a shut-off function for stopping downstream engine bleed air, which is activated when the solenoid is energized. The PRSOV may also be provided with a mechanism for manually overriding the regulating and/or shut-off functions, for example by locking the PRSOV in an open or a closed position.

A conventional pressure regulating shut-off valve 10 is shown in FIG. 1. The valve comprises an inlet 16, an outlet 13, a pressure relief valve 12, a solenoid valve 11, and a duct 14. Duct 14 is installed on the valve to allow fluid communication between the valve inlet 16 and the solenoid valve 11 for controlling the shut-off function. The solenoid may control the flow from the duct 14 to actuate a shut-off cylinder within the valve to prevent airflow from the inlet 16 to the outlet 13.

PRSOVs must operate in extreme temperature and pressure conditions, and must be reliable enough to ensure flight safety. The materials that PRSOVs are made of must therefore be able to accommodate high temperatures and pressures, while being sufficiently durable to be ensure safely. It is also desirable that PRSOVs should be as light as possible, since they are employed in aircraft.

SUMMARY

According to the present invention there is provided a pressure regulating shut-off valve comprising a valve body, at least one piston serving as a regulating piston and/or a shut-off piston, a solenoid valve, and a pressure relief valve, wherein the valve body defines an inlet and an outlet, and comprises at least a portion formed by an additive manufacturing process.

By forming at least a portion of the valve body using an additive manufacturing process, the size and geometry can be controlled precisely, thereby ensuring a minimum weight for a given strength. For example, additive manufactured walls of the valve body can be made to a desired optimal thickness sufficient to withstand the environment that the valve is used in, but not so thick as to be too heavy. Excess weight can therefore be reduced. This is particularly advantageous in the preferred arrangement where the valve is an aerospace part. Unlike conventional parts that are cast and then machined, it is not necessary to allow for excess strength to withstand the stresses that occur during machining. In addition, since the additive manufactured part valve body is advantageously formed in a complete state, it does not need to undergo machining and be subject to the stresses/strains of machining, as well as the risk of damage from, e.g., scratching or overheating. The valve of the first aspect is therefore less likely to development defects (e.g. small cracks) which may act as foci of forces (e.g. from vibrations) during use and cause degradation of the valve. Further, the strength and temperature resilience of the material formed by additive manufacturing is superior to that of known cast materials, so that the valve of the present invention may use less material to achieve the same durability as known valves, and may hence be lighter. In the alternative the valve of the present invention may be more durable for a given weight than known valves.

The valve body may comprise a front portion, a centre portion and a rear portion. The front portion is at the inlet to the valve and the rear portion is at the outlet from the valve. One or more of these portions may be formed by an additive manufacturing process. The portions may be made separately, including separately formed parts using additive manufacturing, or they may be formed together in a single manufacturing step. The portion(s) formed by additive manufacturing may include walls of the valve body as well as advantageously any required internal geometry, such as passageways or ducts as may be required for fluid flow during use of the valve. This includes geometries that are not possible to form by machining, as well as geometries that could be machined but would require multiple manufacturing processes or additional machining steps.

The additive manufactured portion of the valve body may be the front portion of the valve body. The front portion may comprise a duct formed by the additive manufacturing process and defined within a wall of the front portion. In one example the duct provides fluid communication between the inlet and the solenoid valve. This duct can be used during operation of the valve in the same way as the duct 14 in FIG. 1. Since the duct can be formed integrally with the front portion of the valve body then this duct does not need to be installed on the valve at a later stage, which simplifies the construction process. In a conventional valve of this type the duct would require separate pipework leading to additional manufacturing steps as well as resulting in an ungainly final product, with an exposed pipe at risk of damage as with the duct 14 in FIG. 1. The location of the duct within a wall of the front portion of the valve body can also make the PRSOV more compact, as well as lighter, than known valves, since the same function may be achieved with less material.

The pressure regulating shut-off valve may comprise a single piston that functions both as a regulating piston, and as a shut-off piston. An example of such a valve is shown in FIG. 2. Alternatively, the valve may comprise two separate pistons providing a shut-off piston and a regulating piston.

A separate shut-off piston may be actuated in isolation from a separate regulating piston, and vice versa.

The valve body may define a main passageway for fluid communication from the inlet to the outlet. The front portion may comprise the inlet for fluid communication into the main passageway. The main passageway may take any desired shape, since it is formed by additive manufacturing processes rather than by casting or machining of a cast.

The valve body may define a reference chamber fluidly connected to the pressure relief valve. The regulating piston may be partially disposed in air-tight engagement in the reference chamber. The operation of the regulating piston may control the downstream pressure of the valve. The regulating piston and reference chamber may be configured such that an increase of downstream pressure above a predetermined threshold causes the regulating piston to move to a closed position in which fluid communication from the inlet to the outlet is prevented. This actuation of the regulating piston may be caused by a pressure differential between an internal face and an external face of the piston head of the regulating piston disposed in the reference chamber. The regulating piston may include ports which allow airflow through the main passageway of the valve from the inlet to the outlet when the regulating piston is in a first (open) position. The ports may be sheathed in the reference chamber when the regulating piston is in a second (closed) position. The regulating piston may also be actuated to any position between the open position and the closed position, and the ports may therefore be partially sheathed by any amount in the regulating chamber. The position of the regulating piston may therefore be continuously controlled by the pressure differential between the internal and external faces of the piston head disposed in the reference chamber, and hence may continuously regulate the downstream pressure. Other means such as springs may be included in the valve to contribute to the balance of forces on the regulating piston. The reference chamber may be formed to a desired geometry using additive manufacturing, and hence may require less material than if it were machined. In some examples the reference chamber is formed within the centre portion of the valve body.

The valve body may define a shut-off chamber fluidly connected to the solenoid valve. The shut-off piston may be partially disposed in air-tight engagement in the shut-off chamber. The shut-off piston and shut-off chamber may be configured such that an increase of pressure within the shut-off chamber above a predetermined threshold causes the shut-off piston to move (be actuated) to a closed position in which fluid communication from the valve inlet to the valve outlet is prevented. The pressure of the shut-off chamber may be controlled by the solenoid valve, which is in turn controlled by an electronic signal from a controller. The solenoid may cease pressurising the shut-off chamber, and the pressure in the inlet may actuate the shut-off piston to an open position in which air flow can be communicated from the inlet to the outlet.

The pressure relief valve may be configured to open when a pressure in the reference chamber exceeds a predetermined threshold. The predetermined threshold of the pressure relief valve may be controlled by a relief spring disposed in the pressure relief valve. The reference chamber may be fluidly connected to the pressure relief valve by a conduit, and preferably the conduit is within a portion of the valve body which is formed by an additive manufacturing process, with the conduit being formed by the additive manufacturing process.

The pressure regulating shut-off valve may be an anti-ice pneumatic valve, and may be used in an aircraft or in any aeronautical or aerospace field.

In another aspect the invention provides a method of manufacturing a pressure regulating shut-off valve comprising a valve body, a regulating piston, a shut-off piston, a solenoid valve, and a pressure relief valve, wherein the valve body defines an inlet and an outlet; the method comprising forming at least a portion of the valve body using an additive manufacturing process. The method may include providing features as discussed above, and for example may include forming a front portion of the valve body using the additive manufacturing process, wherein a duct is formed within a wall of the front portion during the additive manufacturing process, the duct being arranged to provide fluid communication from the inlet to the solenoid valve.

The term additive manufacturing as used herein may include laser sintering, industrial 3D printing, or any suitable process in which incremental amounts of material are combined to form a homogeneous, unitary component, particularly when the material is added in layers, for example planar layers.

BRIEF DESCRIPTION OF THE DRAWINGS

The invention will now be described below by way of example only and with reference to certain Figures, wherein.

DETAILED DESCRIPTION

Figure 1:
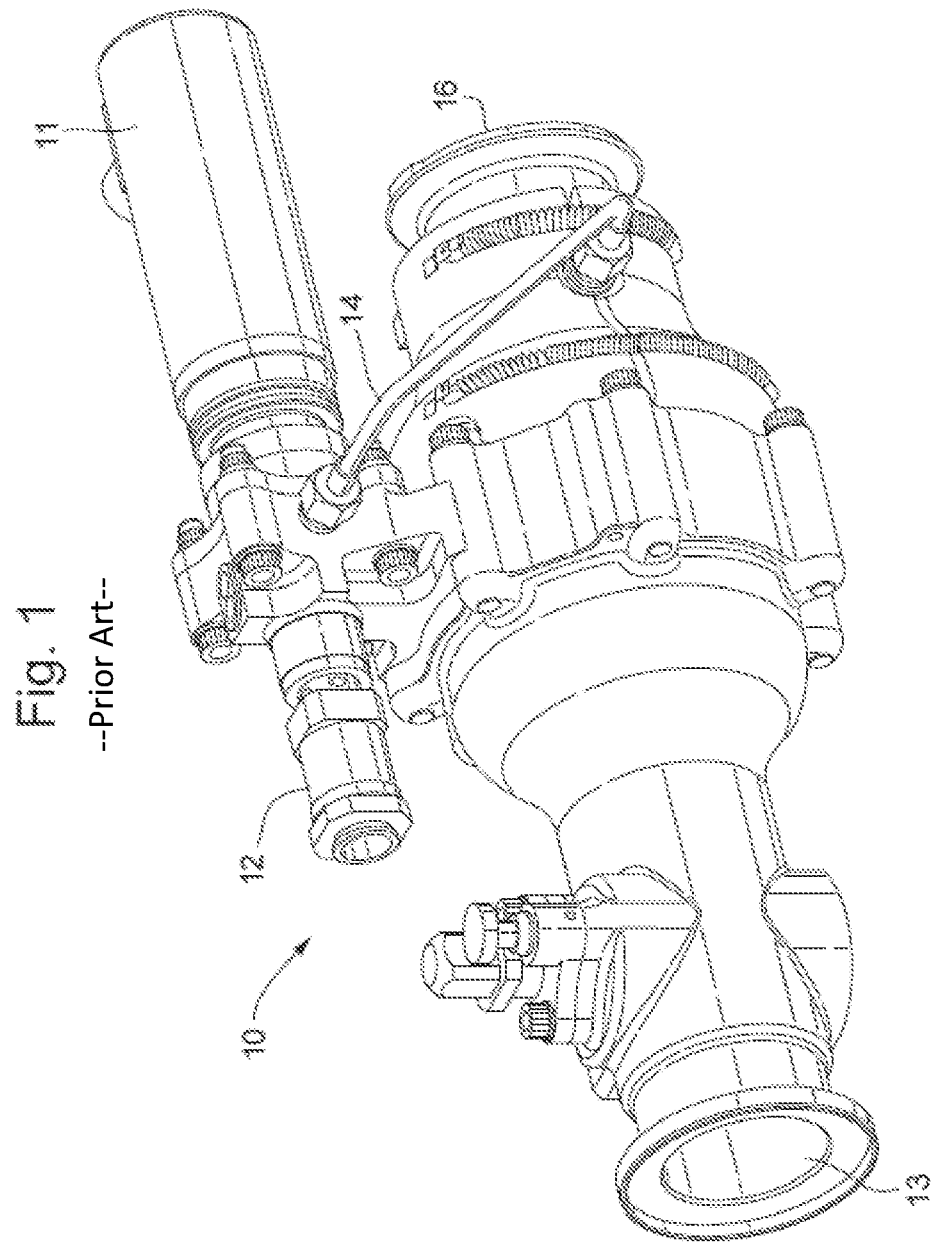
FIG. 1 shows a perspective view of a known pressure regulating shut-off valve with a regulating piston and a shut-off piston.
Figure 2:
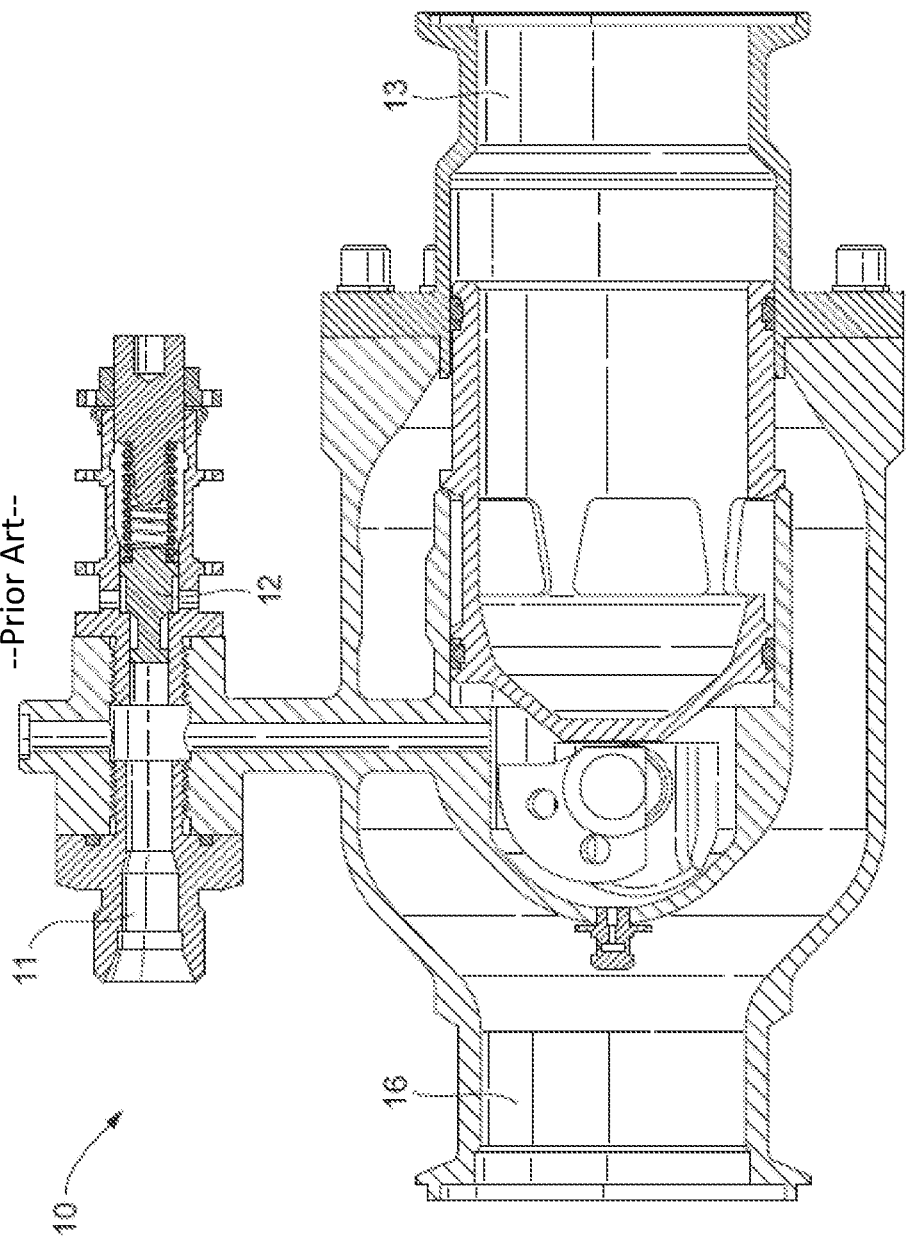
FIG. 2 shows a cross-section of a known pressure regulating shut-off valve with a single piston.
Figure 3:
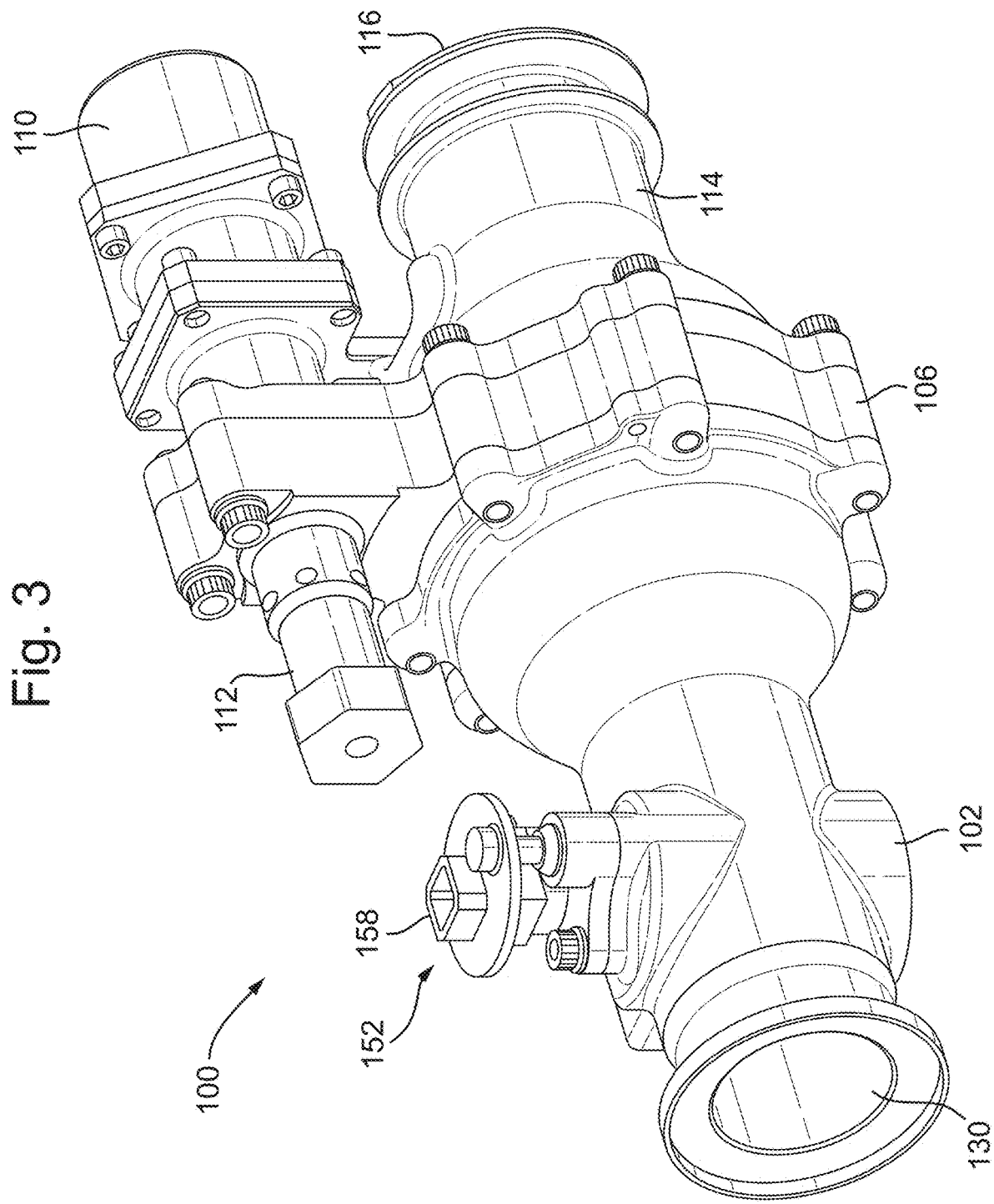
FIG. 3 shows a perspective view of a pressure regulating shut-off valve formed by an additive manufacturing process.
Figure 4:
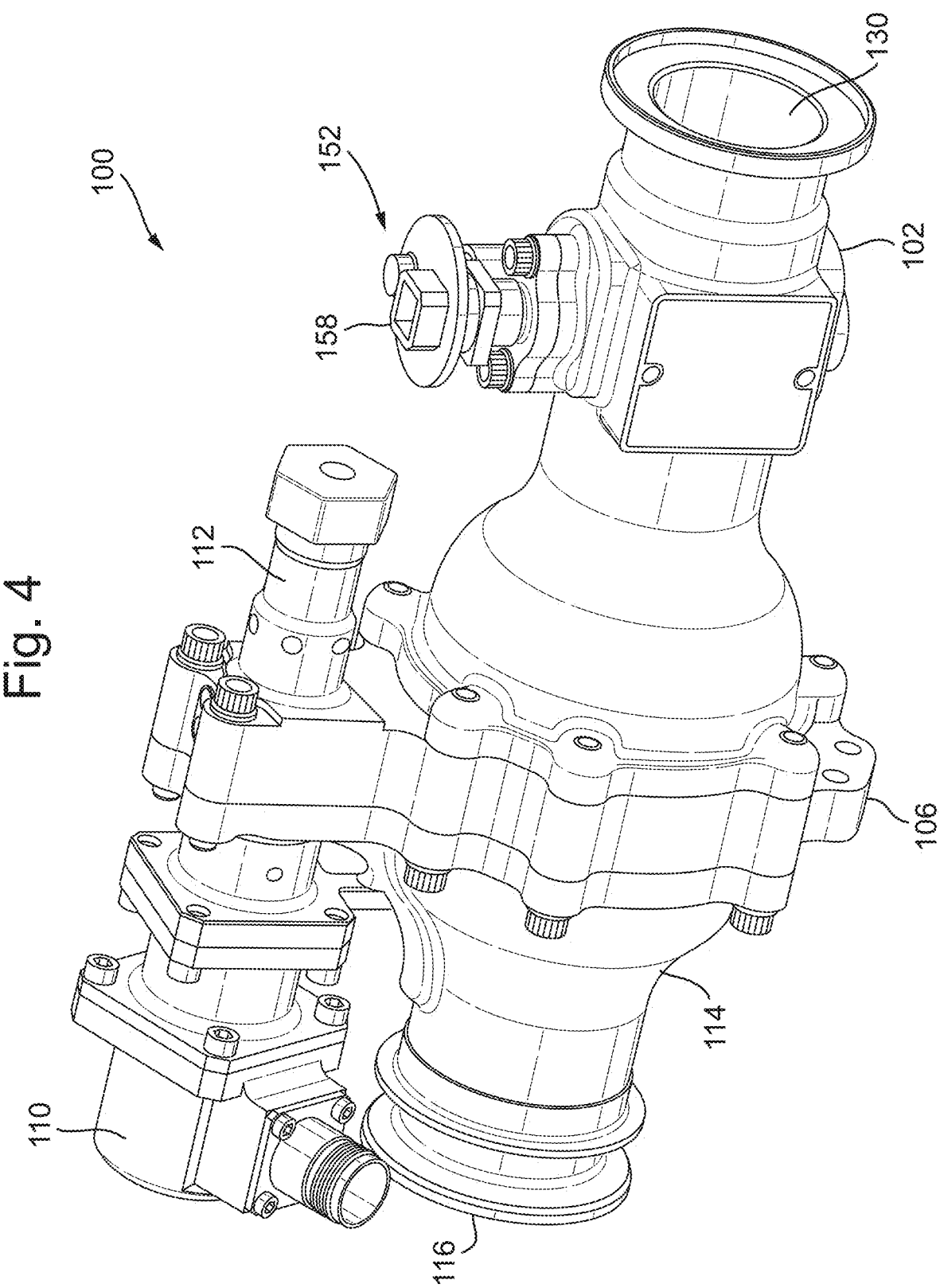
FIG. 4 shows an alternative perspective view of the pressure regulating shut-off valve of FIG. 3.
Figure 5:
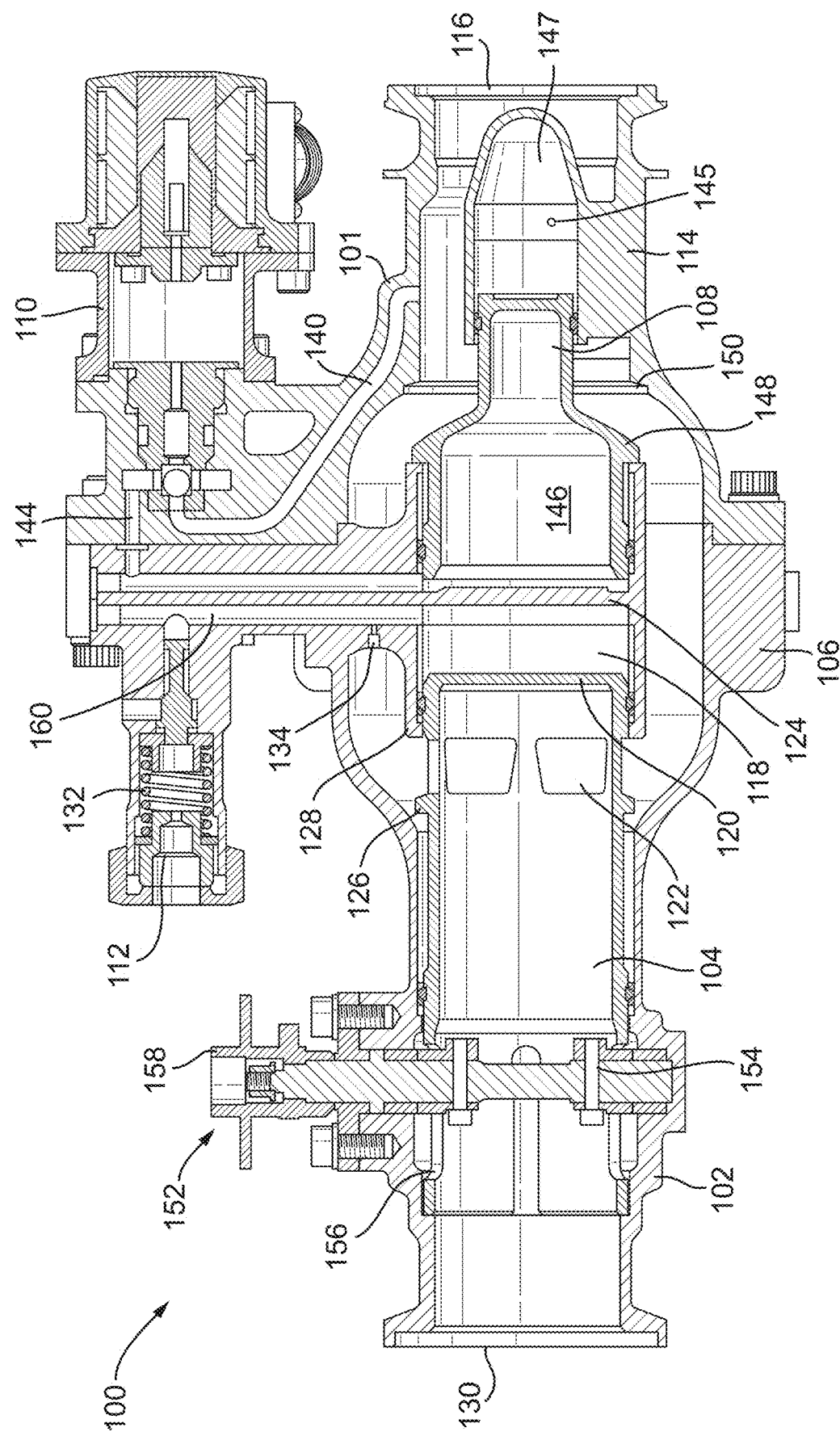
FIG. 5 shows a cross-section of the pressure regulating shut-off valve of FIGS. 3 and 4 with a regulating piston open.
Figure 6:
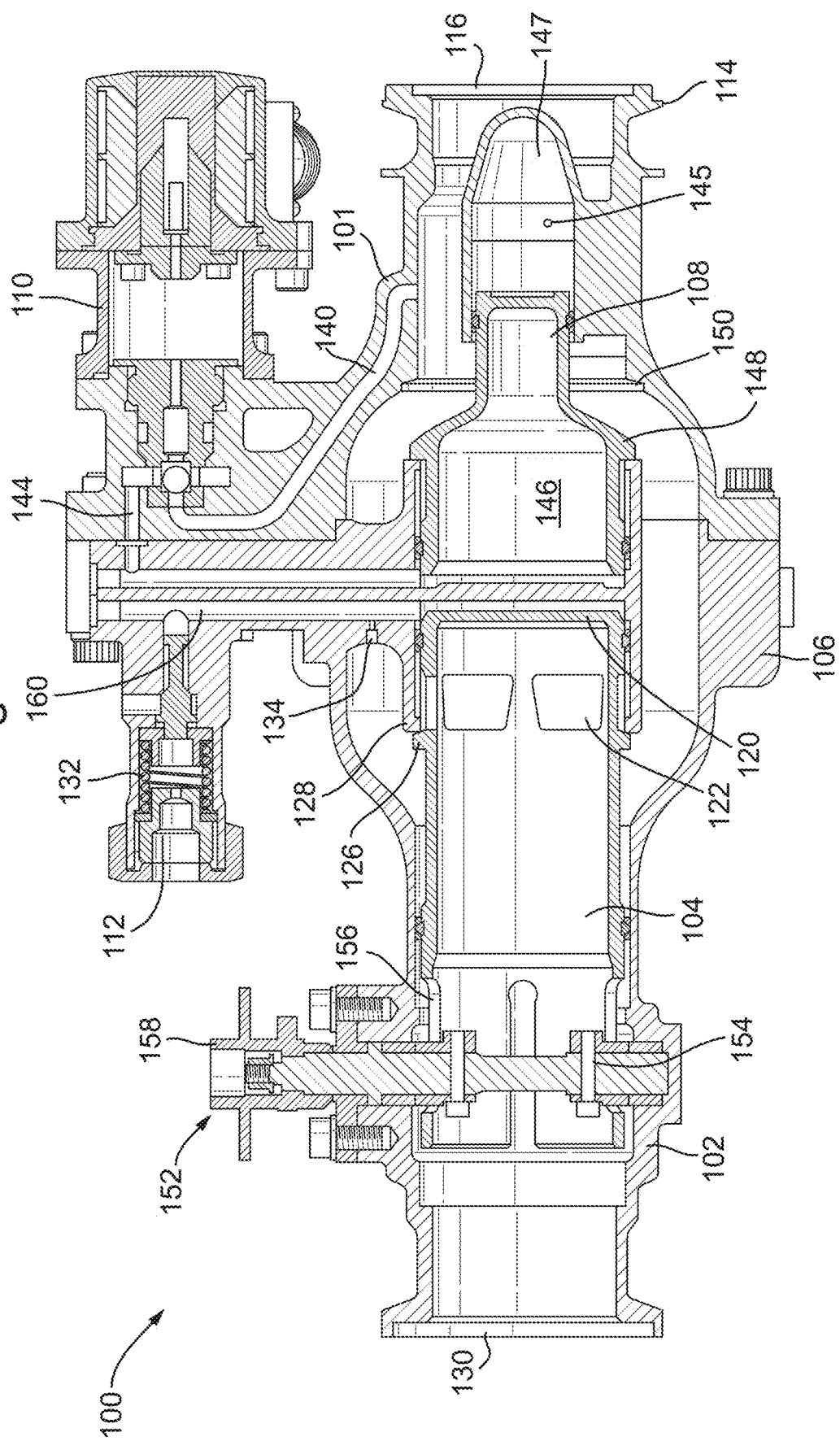
FIG. 6 shows another cross-section of the pressure regulating valve of FIGS. 3, 4 and 5 with the regulating piston closed.

A pressure regulating shut-off valve is formed at least partially by an additive manufacturing process. FIGS. 3 and 4 show perspective views of the valve and a cross-section of the same valve is shown in FIG. 5. The depicted valve consists of three main portions; a rear portion 102, a centre portion 106, and a front portion 114. The three portions of the valve body may be integrally formed using an additive manufacturing technique. That is, they may each be formed separately or as a single component, and the division between portions may be merely for the purpose of description. The additive manufacturing techniques used to form the valve are such that the body is formed by the incremental addition of small amounts or successive layers of raw material so as to form the complete body. The valve body may be complete in that it does not require further work or machining to make it suitable for its purpose, e.g. it does not need ducts, passageways or chambers machined therein or installed thereon. Such processes stand in contrast to other manufacturing processes wherein the final completed component is formed by several steps, such as casting and the machining, and wherein further parts are added later, such as the duct 14 in the prior art valve of FIG. 1.

The rear portion 102 houses a regulating piston 104, which may be prevented from rotation inside the rear portion 102 by suitable means. The centre portion 106 can act as a guide for both the regulating piston 104 and a shut-off piston 108, and may include two separate pressure ports for connection to a solenoid valve 110 and to a pressure relief valve 112. The front portion 114 includes the valve inlet 116, and also houses the shut-off piston 108.

As described above, the valve may have three operating modes: regulation, shut-off and manual override. The regulating function is controlled by the relief valve 112. The relief valve 112 is pneumatically connected to an inlet 116 of the valve by means of a network of ducts that provide pressurized air from the inlet 116 to a reference chamber 118 and to the relief valve 112. For example, a calibrated orifice 134 feeds inlet air to the reference chamber 118. In order to achieve the pressure regulating function it is necessary to maintain the pressure in the reference chamber 118 at a certain value. This may be achieved by having a continuous air flow from the inlet 116 to the reference chamber 118 and from there to the atmosphere through the relief valve 112.

The reference chamber 118 is disposed within the centre portion 106, and is in sealing engagement with the regulating piston 104. A relief duct 160 connects the reference chamber 118 with the pressure relief valve 112, allowing communication of fluid therebetween, and the orifice 134 provides calibrated fluid communication between the relief duct 160 and interior of the centre portion 106 of the valve. Pressure drops in the orifice 134 and in the relief valve 112 determine the pressure in the reference chamber 118. Having set the pressure in the reference chamber, the regulating piston 104 will position itself in such a way that the downstream pressure will equalize with that of the reference chamber 118 to achieve equilibrium.

When the pressure inside the reference chamber 118 exceeds a predetermined value that is greater than the relief valve cracking (i.e. opening) pressure, the relief valve 112 opens and vents airflow to the external environment. As air is vented from the relief valve 112, the pressure inside the reference chamber 118 drops until it is less that that required to keep the pressure relief valve 112 open (i.e. less than the relief valve cracking pressure), and the relief valve closes. Hence, the pressure relief valve 112 maintains the pressure inside the reference chamber 118 at a substantially constant value. A continuous, calibrated air flow helps establish a desired pressure in the reference chamber.

If the pressure downstream of a valve outlet 130 increases above the pressure of the reference chamber 118 (as controlled by the relief valve 112), a pressure differential arises across a piston head 120 of the regulating piston 104, between an internal face of the piston head 120 and an external (to the piston) face of the piston head 120. This pressure difference generates a force that pushes the regulating piston 104 towards a closed position. In the closed position, the piston head 120 of the regulating piston 104 moves to a position proximate the internal wall 124 of the reference chamber 118, so that a lip 126 of the regulating piston 104 bears against a rim 128 of the reference chamber 118. Therefore, when the regulating piston 104 is in the closed position, ports 122 defined therein are sheathed within the reference chamber 118. Hence, in the closed position, no airflow can pass through ports 122 from the inlet 116 side of the valve to the outlet 130 side.

Consequently, when the regulating piston 104 is in the closed position, the pressure downstream of the outlet 130 drops, which in turn reduces the pressure differential across the piston head 120 of the regulating piston 104, thereby reducing the closing force acting on the regulating piston 104. This force reduces until equilibrium between the downstream pressure and the reference chamber 118 pressure is reached. In this way, the pressure downstream of the valve cannot exceed a predetermined regulated value.

The regulated pressure is controlled by a relief spring 132 disposed in the relief valve 112, which controls at which pressure the relief valve 112 will crack (i.e. open), and hence regulates the pressure of the reference chamber 118 as described earlier. The relief spring 132 may be installed during the production phase of component. The relief valve 112 may remain in a partially open position determined by the balance of forces between the pressure of the reference chamber 118 and the force of the spring 132.

The valve is also equipped with a three-way solenoid valve 110, which allows the anti-ice valve operation to be enabled, or disabled (and the air flow stopped), depending on the electrical command received by the solenoid valve 110. The solenoid 110 is pneumatically supplied by the valve inlet 116 air pressure via a solenoid control duct 140. The duct 140 may be internal to the valve body 101, and may be formed during formation of the valve body 101. Particularly, it may be formed in the body as part of the additive manufacturing process. The duct may therefore be formed within a wall of the valve body 101, and its geometry can be controlled.

Since the duct 140 may be formed as part of the additive manufacturing process used to manufacture the valve, it may be very smooth, particularly it may be more smooth than ducts formed by machining through a valve body formed by casting. The smoothness of the duct ensures consistent pressure control within the valve.

The solenoid 110 is connected to a control flow from the valve inlet 116 through the solenoid control duct 140 and an exhaust flow through an exhaust duct 144 that connects to a shut-off chamber 146 in the centre portion of the valve. The solenoid valve 110 receives an on command and/or an off command through an electrical signal provided by the engine control electronics (not shown).

In an energized condition, the solenoid 110 allows airflow from the valve inlet 116 in order to pressurize the shut-off chamber 146. The shut-off chamber 146 is in sealing engagement with the shut-off piston 108, such that no air flows between the shut-off chamber 146 and the interior of the centre portion of the valve. The exterior parts of the shut-off piston 108 that are exposed to the inlet pressure at the valve inlet 116 have a lesser area than the internal parts of the shut-off piston 108 that are exposed to the same pressure within the shut-off chamber 146. Therefore, when the solenoid 110 causes the shut-off chamber 146 to become pressurised by the valve inlet pressure, the shut-off piston 108 is moved to a closed position preventing flow through the valve from the valve inlet 116.

In the closed position, the shut-off piston 108 slides out of the shut-off chamber 146, so that the shoulder 148 of the shut-off piston 108 seats against a seal 150 defined in the valve body 101. Airflow from the inlet 116 is hence obstructed by the shut-off piston 108 and is thereby prevented from entering the centre portion 106 of the valve, and hence progressing to the outlet 130. A portion of the shut-off piston 108 is sheathed within a small chamber 147. The small chamber 147 helps with differential area control i.e. control of the difference in surface areas between the internal parts of the shut-off piston 108 and the exterior parts of the shut-off piston 108, that are exposed to pressures for actuating the shut-off piston 108. The small chamber 147 includes a vent 145 to the atmosphere, which helps avoid pressurisation of the small chamber 147 caused by air leakage from the valve interior. The vent may be formed during the additive manufacturing process, and therefore may not need to be machined in the valve body 101.

In the de-energised condition, the solenoid 110 de-pressurizes the shut-off chamber 146. Consequently, the shut-off piston 108 is urged to the open position. The shoulder 148 of the shut-off piston 108 is forced away from the seal 150, thereby allowing airflow from the inlet 116 to the rest of the valve, so that the anti-ice valve is enabled to perform the regulating function.

The valve may be further equipped with a manual override 152 able to lock the valve in an open position. The manual override 152 is based on two cams 154 housed in cut-outs 156 of the regulating piston 104. To manually open the valve, a square pin 158 which extends through the rear portion 102 may be rotated to an open position, which may be defined by a mark to indicate the position to an operator. In order to prevent accidental rotation of the square pin 158, a spring loaded button may be provided, which may need to be pushed in an axial direction to disengage a locking chamfer, thereby permitting rotation of the square pin 158 and hence of the cams 154. For the valve to reach a fully open position, the cams 154 must be rotated by a predetermined amount, for example by about 90°. After removing the axial force from the spring loaded button, the cam may remain locked in the fully open position.

Fluid communication of airflow within the valve enables its proper operation. Since part(s) of the valve is(are) formed by additive manufacturing, the internal ducts, such as duct 140, can be defined within the body of the valve, rather than needing to be attached to it, or machined into it at a later stage. The ducts may therefore be formed with interior surfaces which are smoother than those of ducts formed by casting or machining. Such smoothness enables reliable operation of the valve, and helps prevents issues such as uneven pressure distributions which may cause cracking.

A further consequence of forming parts of the valve body by an additive manufacturing process is that no stress concentrations are created in the body during machining. Anti-ice pneumatic valves are typically employed in high-temperature and high pressure environments, and small defects may be exacerbated, causing e.g. fracturing. The additive manufacturing process allows the valve body to be formed without stress/strain arising in the component. Hence, forces applied to the valve body are distributed evenly throughout the body, and will not focus at defects caused by machining.

Another consequence of forming parts of the valve using additive manufacturing techniques is that the properties of the material itself can have superior strength and temperature characteristics, particularly compared components made by casting and/or machining.

Another consequence of forming the valve using additive manufacturing techniques is that it may be formed with the desired size and geometry. Therefore, there is no excess material in the final valve body. In contrast, for valves formed by e.g. a machining process, the thickness of the body walls must be sufficient that they can withstand the machining processes required to form internal chambers and/or ducts.

Therefore, the disclosed valve may be formed to the desired size and, with any required internal arrangement of chambers and ducts, without excess material, from a more resilient and durable material. The final valve may therefore have a reduced weight compared to those known in the art.

The invention has been described with reference to an exemplary embodiment, but the skilled person will appreciate that modification and alternations may be made thereto which remain within the scope of the invention as defined by the appended claims.

The invention claimed is:

1. A pressure regulating shut-off valve comprising a valve body, a regulating piston, a shut-off piston, a solenoid valve, and a pressure relief valve; wherein the valve body defines an inlet and an outlet, and comprises at least a portion formed by an additive manufacturing process;
   wherein the valve body comprises a front portion comprising the inlet, a centre portion, and a rear portion comprising the outlet;
   wherein the centre portion is disposed between the front portion and the rear portion;
   wherein one or more of the front portion, the centre portion and the rear portion are formed by the additive manufacturing process and the additive manufacturing of the portion(s) includes forming internal passageways or ducts;
   wherein the front portion houses the shut-off piston and the rear portion houses the regulating piston;
   wherein the shut-off piston and the regulating piston are each separately actuable to prevent fluid communication from the inlet to the outlet; and
   wherein the front portion is formed by the additive manufacturing process and comprises a duct internal to the valve body, the duct being defined entirely within a wall of the front portion and formed during the additive manufacturing process, wherein the duct extends within the wall from the solenoid valve to the inlet and thereby connects the solenoid valve and the inlet so that all fluid communication from the inlet to the solenoid valve is within the wall of the valve body, the duct configured to pneumatically supply the solenoid valve from the inlet.

2. The pressure regulating shut-off valve as claimed in claim 1, wherein the valve body defines a main passageway for fluid communication from the inlet to the outlet; wherein the front portion comprises the inlet for fluid communication into the main passageway.

3. The pressure regulating shut-off valve as claimed in claim 1, wherein the valve body defines a reference chamber fluidly connected to the pressure relief valve, and wherein the regulating piston is partially disposed in air-tight engagement in the reference chamber.

4. The pressure regulating shut-off valve as claimed in claim 3, wherein the pressure relief valve is configured to open when a pressure in the reference chamber exceeds a predetermined threshold.

5. The pressure regulating shut-off valve as claimed in claim 3 configured such that the position of the regulating piston is determined by a difference in pressures between the downstream pressure and the reference chamber pressure, and such that the position of the regulating piston regulates the flow of air to the outlet.

6. The pressure regulating shut-off valve as claimed in claim 5, wherein an increase of downstream pressure above a predetermined threshold causes the regulating piston to move to a closed position in which fluid communication from the inlet to the outlet is prevented.

7. The pressure regulating shut-off valve as claimed in claim 1, wherein the valve body defines a shut-off chamber fluidly connected to the solenoid valve, and wherein the shut-off piston is partially disposed in air-tight engagement in the shut-off chamber.

8. The pressure regulating shut-off as claimed in claim 7, configured such that pressurisation of the shut-off chamber causes the shut-off piston to move to a closed position in which fluid communication from the inlet to the outlet is prevented.

9. The pressure regulating shut-off valve as claimed in claim 1, wherein the valve is an anti-ice pneumatic valve.

10. An aircraft comprising the pressure regulating shut-off valve as claimed in claim 1.

11. A method of manufacturing a pressure regulating shut-off valve comprising a valve body, a regulating piston a shut-off piston, a solenoid valve, and a pressure relief valve, wherein the valve body defines an inlet and an outlet; the method comprising forming at least a portion of the valve body using an additive manufacturing process;

wherein the valve body comprises a front portion comprising the inlet, a centre portion, and a rear portion comprising the outlet;

wherein the centre portion is disposed between the front portion and the rear portion;

wherein one or more of the front portion, the centre portion and the rear portion are formed by the additive manufacturing process and the additive manufacturing of the portion(s) includes forming internal passageways or ducts;

wherein the front portion houses the shut-off piston and the rear portion houses the regulating piston;

wherein the shut-off piston and the regulating piston are each separately actuable to prevent fluid communication from the inlet to the outlet; and wherein the front portion houses the shut-off piston and is formed by the additive manufacturing process and comprises a duct internal to the valve body, the duct being defined entirely within a wall of the front portion and formed during the additive manufacturing process, wherein the duct extends within the wall from the solenoid valve to the inlet and thereby connects the solenoid valve and the inlet so that all fluid communication from the inlet to the solenoid valve is within the wall of the valve body, the duct configured to pneumatically supply the solenoid valve from the inlet.

* * * * *